US008990547B2

(12) United States Patent
Callister et al.

(10) Patent No.: US 8,990,547 B2
(45) Date of Patent: Mar. 24, 2015

(54) SYSTEMS AND METHODS FOR RE-ORDERING INSTRUCTIONS

(75) Inventors: James R. Callister, Windsor, CO (US); Richard E. Hank, San Jose, CA (US); Teresa L. Johnson, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3013 days.

(21) Appl. No.: 11/209,555

(22) Filed: Aug. 23, 2005

(65) Prior Publication Data

US 2007/0055961 A1  Mar. 8, 2007

(51) Int. Cl.
| G06F 7/38 | (2006.01) |
| G06F 9/00 | (2006.01) |
| G06F 9/48 | (2006.01) |
| G06F 9/45 | (2006.01) |
| G06F 9/26 | (2006.01) |
| G06F 9/30 | (2006.01) |

(52) U.S. Cl.
CPC ............ G06F 8/445 (2013.01); *G06F 9/30043* (2013.01); G06F 9/26 (2013.01)
USPC ............................ 712/245; 717/153; 717/161

(58) Field of Classification Search
CPC ..................................................... G06F 8/445
See application file for complete search history.

(56) References Cited

U.S. PATENT DOCUMENTS

| 5,287,466 | A | * | 2/1994 | Kodama ........................ 712/206 |
| 6,092,180 | A | * | 7/2000 | Anderson et al. ............. 717/158 |
| 2003/0033510 | A1 | | 2/2003 | Dice | |
| 2003/0200539 | A1 | * | 10/2003 | Fu et al. ........................ 717/161 |

FOREIGN PATENT DOCUMENTS

GB          2265481 A    *  9/1993

OTHER PUBLICATIONS

Choi, Y; A Knies; G Vedaraman; and J Williamson. "Design and Experience: Using the Intel® Itanium® 2 Processor Performance Monitoring Unit to Implement Feedback Optimizations." $2^{nd}$ Workshop on Explicitly Parallel Instruction Computing. Nov. 18, 2002. Accessed from http://systems.cs.colorado.edu/EPIC2/papers/s2-3-choi.pdf on Mar. 19, 2009.*
Patel, SJ and SS Lumetta. "rePLay: A Hardware Framework for Dynamic Optimization." Jun. 2001. IEEE Transactions on Computers. 50(6):590-608.*
Gray et al. Itanium—A System Implementor's Tale (2005).*
Romer et al., Instrumentation and Optimization of Win32/Intel Executables Using Etch, Published at USENIX NT Conference, 1997, pp. 1-9.

(Continued)

*Primary Examiner* — Don Wong
*Assistant Examiner* — Erika Kretzmer
(74) *Attorney, Agent, or Firm* — Kraguljac Law Group, LLC

(57) ABSTRACT

Systems, methodologies, computer-readable media, and other embodiments associated with ordering instructions are described. One exemplary system embodiment can include an analysis logic configured to analyze executable instructions from an executable program. A re-write logic can be configured to re-order selected load instructions within the executable program based on latency times for the selected load instructions.

16 Claims, 7 Drawing Sheets

(56) References Cited

OTHER PUBLICATIONS

Gray et al., Itanium—A System Implementor's Tale, Apr. 15, 2005, 2005 USENIX Annual Technical Conference, pp. 265-278.

Schnarr et al., Instruction Scheduling and Executable Editing, Feb. 1996, Published in: Workshop on Compiler Support for System Software, pp. 1-10.

* cited by examiner

SYSTEMS AND METHODS FOR RE-ORDERING INSTRUCTIONS

BACKGROUND

For some computer programming languages, compilers are used to compile source code into an executable program that has an executable sequence of instructions. Certain microprocessors, like the Itanium processor manufactured by Intel, can execute multiple instructions simultaneously within a clock cycle. Instructions assigned within the same clock cycle are referred to as being within an instruction bundle. Instruction bundles may include one or more load instructions that involve a read of memory. Compilers generally order two or more load instructions in an instruction bundle arbitrarily and thus the executable code may not be optimized for performance. One reason is that compilers often order the load instructions based on heuristics and do not take into account run-time performance information.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
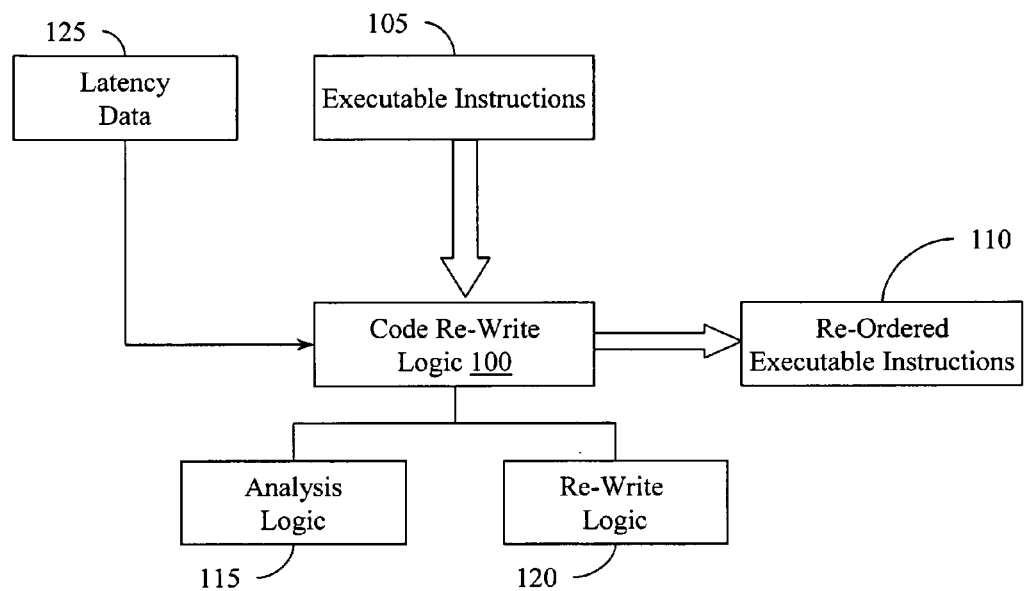
FIG. 1 illustrates one example embodiment of a system for re-ordering instructions.

Example systems, methods, media, and other embodiments are described herein that relate to improving performance of an executable program. In one embodiment, load instructions within the executable program can be identified, and selected load instructions can be re-ordered in the execution sequence based on their latency times. For example, the latency times can be measured during run-time of the executable program. Load instructions that often result in a miss will typically have a longer latency time to complete the load.

Thus, in one example, an executable program can be optimized for a user system in a customized manner since load instructions can be re-ordered based on an observed run-time behavior of the executable program on the user system. Load miss times can be optimized by re-ordering loads as will be described herein.

In one example processor architecture, load instructions may be grouped into bundles where multiple instructions are processed per clock cycle. If, for example, there are two load instructions per clock cycle, the system can be configured to reorder the sequence of the two load instructions so that the load instruction with a longer load time is the first listed instruction in the bundle. In this manner, load instructions within a bundle can be ordered based on decreasing latency times. In one embodiment that uses the Itanium processor, the first instruction in a bundle will get fast path access to the cache. Thus, by ordering the longer instruction first, total latency time for the instruction bundle may be reduced.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer-readable medium", as used herein, refers to a medium that stores and participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM (random access memory), a ROM (read only memory), an EPROM, a FLASH-EPROM, or other memory chip or card, a memory stick, a carrier wave/pulse, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software stored in a computer-readable medium, and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), process, a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, identifying, locating, comparing, analyzing, determining, displaying, or the like, refer to actions and processes of a computer system, logic, processor, or similar electronic device that manipulates and transforms data represented as physical (electronic) quantities.

With reference to the figures, illustrated in FIG. 1 is one embodiment of a code re-write logic 100 that can be configured to re-order load instructions in an executable software program. For example, executable instructions 105 from the executable program can be input to the code re-write logic 100. Selected instructions can then be re-ordered to create re-ordered executable instructions 110. Latency data 125, which can be previously obtained during run-time of the executable instructions 105, can be used by the code re-write logic 100 to determine which load instructions to re-order. In one embodiment, the code re-write logic includes a binary code re-writing tool to re-order the executable instructions without recompiling the executable program. The re-ordered executable instructions 110 can then replace the executable instructions 105 and become part of the executable program.

In one embodiment, the code re-write logic 100 can include an analysis logic 115 that is configured to analyze the executable instructions 105 from the executable program. Re-write logic 120 can be configured to re-order selected load instructions within the executable program based on latency times from the latency data 125 associated with the selected load instructions. In one example, the latency of a load instruction can be regarded as the time it takes from a point of issuing a load or a request to a memory like cache memory to a point where the data is actually received from the cache. In one example, the latency can be measured in clock cycles, and latency times can be collected for each load instruction or other desired instruction which is observed during run-time of the executable instructions 105.

By way of background, the executable instructions 105 are initially generated by a compiler that compiles source code into a stream of instructions that have a certain order. The executable instructions 105 will have certain properties at run-time and will have a run-time behavior that can be affected by input data and/or other factors such as the computing system that is executing the program, the availability of resources at the time of the instruction, and the like. Thus, the same sequence of executable instructions 105 can behave differently when executed on two different computing devices and may behave differently on the same computing device at different times based on available resources and/or the state of data.

When the compiler orders the executable instructions 105, the compiler is unaware of how the instructions, including the load instructions, will behave at run-time. Thus, the code re-write logic 100, using the latency data 125 obtained at run-time, can re-order selected load instructions to improve performance of the executing program and optimize the latency time for the selected load instructions. Furthermore, the code re-write logic 100 can provide a customized optimization of the selected load instructions for a specific user system. This can be performed by collecting the latency data 125 or other performance data during run-time of the executable program on the user system.

In one embodiment, the analysis logic 115 can be configured to identify the selected load instructions that are within an instruction bundle to be processed in the same clock cycle. The re-write logic 120 can then re-order the selected load instructions within the bundle to cause a first load instruction having a greater latency time to occur before a second load instruction having a lesser latency time.

For example during run-time, latencies of load instructions can be observed. Suppose in one example that instruction bundles include two load instructions that are issued in the same clock cycle. If one of the two loads is likely to miss at a cache, meaning the data requested is not present in the cache, the re-write logic 120 can order the load instruction that is more likely to miss as the first instruction in the bundle. Of course, three, four, or more instructions may be processed in a single clock cycle depending on the system architecture, and the re-ordering can be applied in a similar manner.

In one embodiment based on the Itanium architecture, the first load instruction in a bundle is given fast path access to cache memory. By placing a load instruction with a longer latency time as the first instruction in a bundle, load miss times can be optimize for the bundle. As a result, the overall latency of processing the load instructions in the corresponding instruction bundle can be reduced as compared to an instruction order where the load instruction with the longer latency time occurs after a load instruction with a shorter latency time. As such, the code re-write logic 100 is configured to re-order the selected load instructions in an order of decreasing latency times. Furthermore, in another embodiment, the selected load instructions are selected as instructions that occur consecutively in the executable instructions 105.

Figure 2:
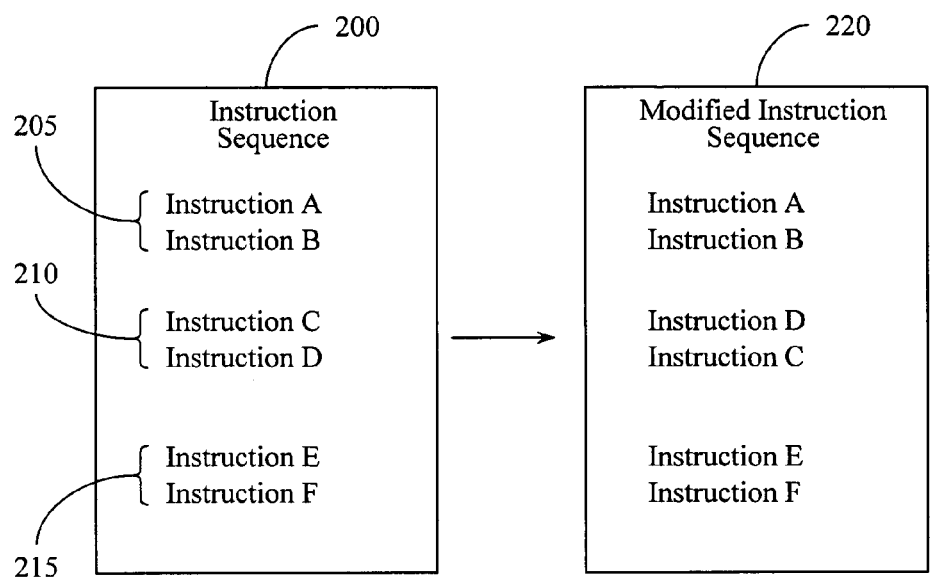
FIG. 2 illustrates an example representation of an instruction sequence being modified.

Illustrated in FIG. 2 is an example representation of an instruction sequence 200 of executable instructions. The instruction sequence 200 can represent a portion of an executable program. In one embodiment, the instruction sequence 200 has been compiled with instruction bundles having two instructions per bundle, which are shown as bundles 205, 210, and 215. Instruction bundle 210 includes instructions C and D where instruction C has been ordered first in the bundle. Suppose during run-time, instruction D is observed to have a longer latency than instruction C.

The analysis logic 115 (shown in FIG. 1) can search and identify load instructions in the instruction sequence 200. Using the latency times associated with each load instruction, the analysis logic 115 can determine whether the order of the load instructions should be changed. In this example, instruction D having a longer latency time than instruction C is selected to be re-ordered. The positions of instructions C and D are then reversed. The resulting modified instruction sequence 220 illustrates the re-ordered instructions.

Figure 3:
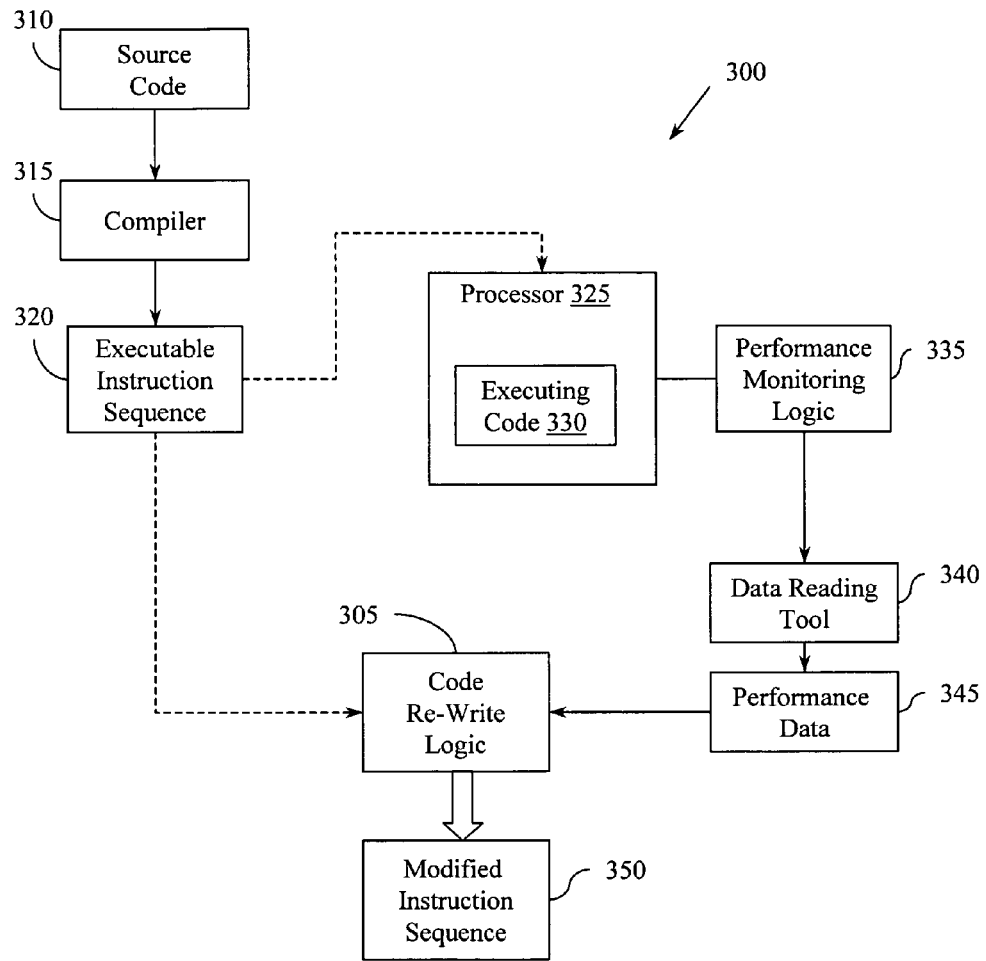
FIG. 3 illustrates one example embodiment of a system for re-ordering instructions.

With reference to FIG. 3, one embodiment of a system 300 is shown that can be configured to re-order load instructions to optimize load miss times. The system 300 can be embodied in a variety of forms including being a computing system, being part of a computing system, and/or having various components distributed between a number of computing devices. The system 300 can include a code re-write logic 305 that can be configured similar to the re-write logic 100 shown in FIG. 1. Any desired component can be embodied as a computer component or logic as defined previously or take on other desired forms.

With further reference to FIG. 3, source code 310 can be inputted to a compiler 315 that is configured to compile the source code into an executable program having an executable instruction sequence 320. As previously described, the executable instruction sequence 320 can include bundles of load instructions that are not necessarily ordered in an optimized way. After being compiled, the executable program can be selected for execution where one or more portions of the instruction sequence 320 is loaded into memory and executed by processor 325. The executing state of the program is represented as executing code 330.

During run time, a performance monitoring logic 335, configured to observe and collect run-time performance data, can be used to monitor the behavior of the executing code 330. For example, the performance monitoring logic 335 can be configured to collect information relating to the interaction of the executing code 330 and the micro-architecture of the processor 335 and other functional units involved during execution. The collected information can include latency times associated with load instructions that are executed. One embodiment of the performance monitoring logic 335 can be a performance monitoring unit (PMU) configured for the Itanium processor. Of course, other types of monitoring logics can be used including custom monitoring tools.

In one embodiment, the system 300 can include a data reading tool 340 configured to read the collected data from the performance monitoring logic 335. The data reading tool 340 may format the data into performance data 345 that can be consumed by the code re-write logic 305. The performance data 345 can be maintained in any suitable data store. In another embodiment, the data reading tool 340 can be part of the code re-write logic 305 to allow the code re-write logic 305 to directly read out the performance data from the performance monitoring logic 305. Once execution of the executing code 330 is complete or at another desired point, monitoring may be stopped. The performance data can be read out from the performance monitoring logic 335 during and/or after the execution of the code 330 and/or may be read continuously or periodically during execution.

Using the run-time performance data 345, the code re-write logic 305 can attempt to optimize load instructions in the executable code. The executable instruction sequence 320 can be inputted and read by the code re-write logic 305. Instruction bundles can be analyzed and load instructions can be identified that occur within a clock cycle. Each load instruction can have an associated latency time that is obtained from the performance data 345 that was observed during run-time. The re-write logic 305 can be configured to re-order the load instructions within the clock cycle in accordance with a decreasing order of the latency times associated to the instructions.

It will be appreciated that load instructions can include memory access instructions and the associated latency time can represent a length of time for completing a memory access instruction during run-time of the executable program. Selected load instructions within a clock cycle can be re-ordered so that a longer load occurs prior to a shorter load. This modifies the existing executable program and creates a modified instruction sequence 350. The modified instruction sequence 350 can then be written back to replace the previous version of the executable instruction sequence 320 to become the current version of the executable program.

It will be appreciated that not all load instructions need to be re-ordered even when they are in an increasing order of latency. The code re-write logic 305 can selectively locate the instruction bundles that contain loads with the highest recorded latency times, which can be based on a predetermined latency threshold. The system can focus to re-order loads with the largest latencies if desired. In another embodiment, the system can be configured to determine whether a re-ordering is appropriate without violating the architecture or the intent of the program. This may include analysis of stop bits within the instruction bundle and existing and alternative bundle templates.

The embodiment of FIG. 3 illustrates one example of a static optimization of the executable program. Using the code re-write logic 305, the executable program can be optimized without using the source code 310 and without recompiling the source code. The executable instruction sequence 320 can be read in, modified, and written back out.

Figure 4:
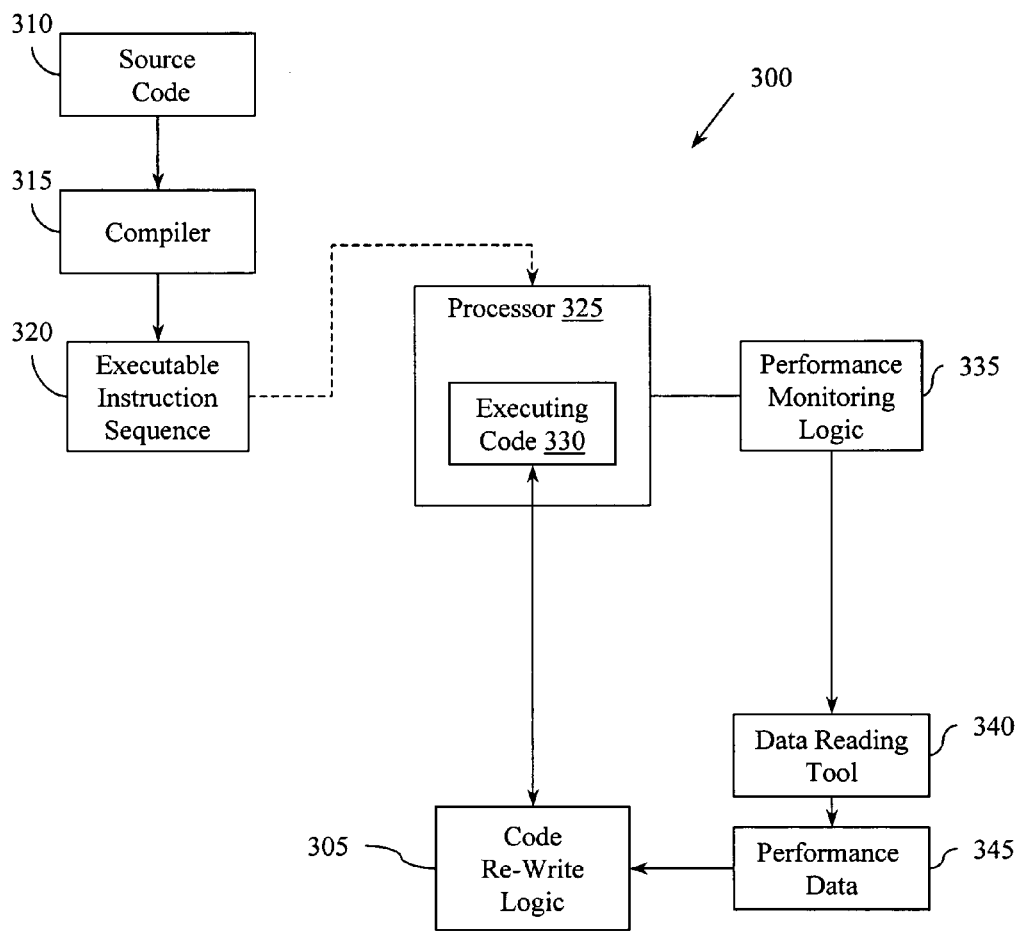
FIG. 4 illustrates another example embodiment that is a variation of the system of FIG. 3.

With reference to FIG. 4, another embodiment of the system 300 is illustrated that is configured to perform a dynamic optimization of the executing code 330. For example, the code re-write logic 305 can be configured to analyze latency times from the performance data 345 during a run-time of the executing code 330. As described previously, the code re-write logic 305 can then identify load instructions within the executing code 330 that have long latency times and re-order them with other load instructions within their instruction bundle dynamically within the executing code 330.

The dynamic optimization of the executing code 330 can help to improve the performance of the program in conditions when the program is executed for an extended time period. For example, suppose the executing code 330 is a program that is executed for 24 hours. During the first twelve hours of execution, the run-time environment may cause the code re-write logic 305 to re-order the load instructions with a first sequence. Conditions may then change that affect the latency of certain load instructions causing the code re-write logic 305 to re-order the load instructions. Thus, the executing code 330 may have different instruction sequences that are dynamically changed during the execution of the program. It will be appreciated that the values used are only examples and are not intended to limit the configuration of the system.

Figure 5:
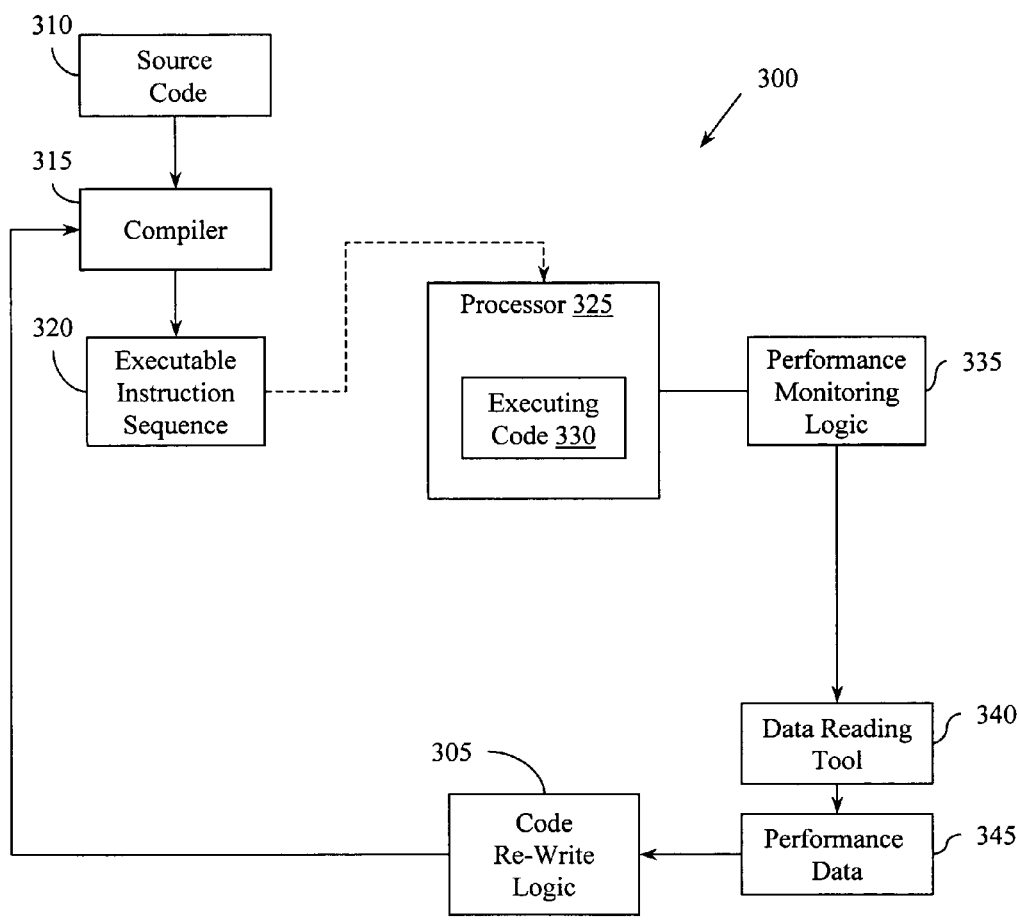
FIG. 5 is another example embodiment of a system that is another variation of FIG. 3.

Illustrated in FIG. 5 is another embodiment of the system 300 that is operably connected to the compiler 315 and configured to provide feedback information to the compiler 315. For example, the code re-write logic 305 can be configured to re-order selected load instructions by instructing the compiler 315 to order selected load instructions in a particular sequence. Accordingly, the compiler 315 would be configured to receive such feedback information and to respond to the feedback by re-ordering the load instructions during compiling.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

In the flow diagrams, the illustrated elements denote "processing blocks" that may be implemented in logic. In one example, the processing blocks may represent executable instructions that cause a computer, processor, and/or logic device to respond, to perform an action(s), to change states, and/or to make decisions. The described methodologies can be implemented as processor executable instructions and/or operations provided by a computer-readable medium. Thus, in one example, a computer-readable medium may provide processor executable instructions operable to perform the described methods and/or their equivalents. In another example, the processing blocks may represent functions and/or actions performed by functionally equivalent circuits such as an analog circuit, a digital signal processor circuit, an application specific integrated circuit (ASIC), or other logic device. The diagrams are not intended to limit the implementation of the described embodiments. Rather, the diagrams illustrate functional information one skilled in the art could use to design/fabricate circuits, generate software, or use a combination of hardware and software to perform the illustrated processing.

Figure 6:
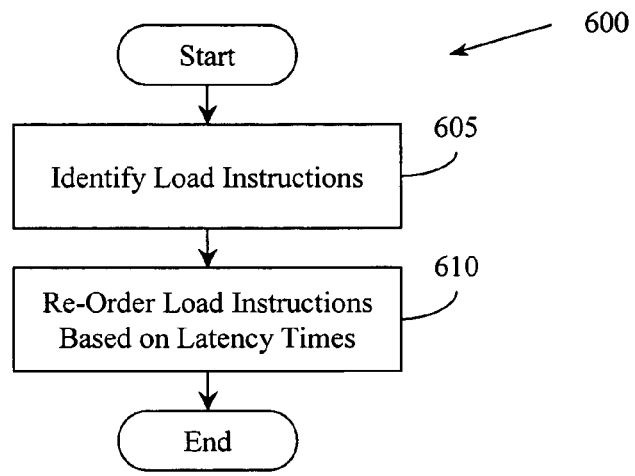
FIG. 6 illustrates one example methodology that can be associated with re-ordering instructions.

With reference to FIG. 6, one embodiment of the methodology 600 is illustrated that can be associated with re-ordering instructions. Using an executable program as input, the methodology 600 can identify load instructions from the executable program (Block 605). As previously explained, the load instructions can have associated latency times that are observed during run-time of the executable program. The method can then selectively re-order the load instructions within the executable program based on the associated latency times (Block 610). In one embodiment, the re-ordering is performed by modifying the executable program without recompiling the program. It will be appreciated that the methodology 600 can be implemented in a variety of forms corresponding to the embodiments shown in FIGS. 3, 4, and 5 where the re-ordering occurs statically, dynamically, and/or through the compiler, respectively.

Figure 7:
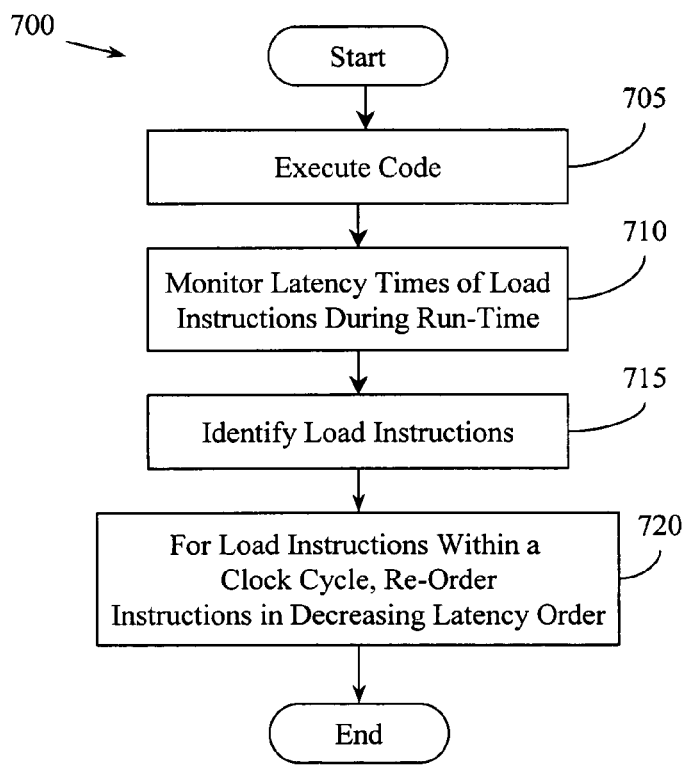
FIG. 7 illustrates another example embodiment of a methodology for re-ordering instructions.

With reference to FIG. 7, another embodiment of a methodology 700 is illustrated that can be associated with re-ordering load instructions. The methodology may initiate by executing code (Block 705) and monitoring latency times of load instructions during run-time (Block 710). After latency data is collected, load instructions can be identified within the executable code (Block 715) and instructions having high latency times can be selected as candidates for re-ordering. In this embodiment, candidate load instructions will be in the same instruction bundle meaning that they are in a sequence to be executed during the same clock cycle. For load instructions that are within the same clock cycle, instructions can be re-ordered in decreasing latency order (Block 720). As stated with the methodology 600, the methodology 700 can be implemented to perform the re-ordering statically, dynamically, and/or through the compiler.

In a static re-ordering, the identifying Block (715) may include reading the executable program from a storage medium and the re-ordering Block 720 is selectively performed statically to modify the executable program. The modified executable program can then be made available during a subsequent run-time.

With the example embodiments, performance of an executable program can be improved. Load miss times may be optimized for a specific user system by observing the behavior of executing load instructions and using the observed data to re-order the load instructions based on latency times. By reducing the load miss times for a group of load instructions, overall performance may then be improved.

Figure 8:
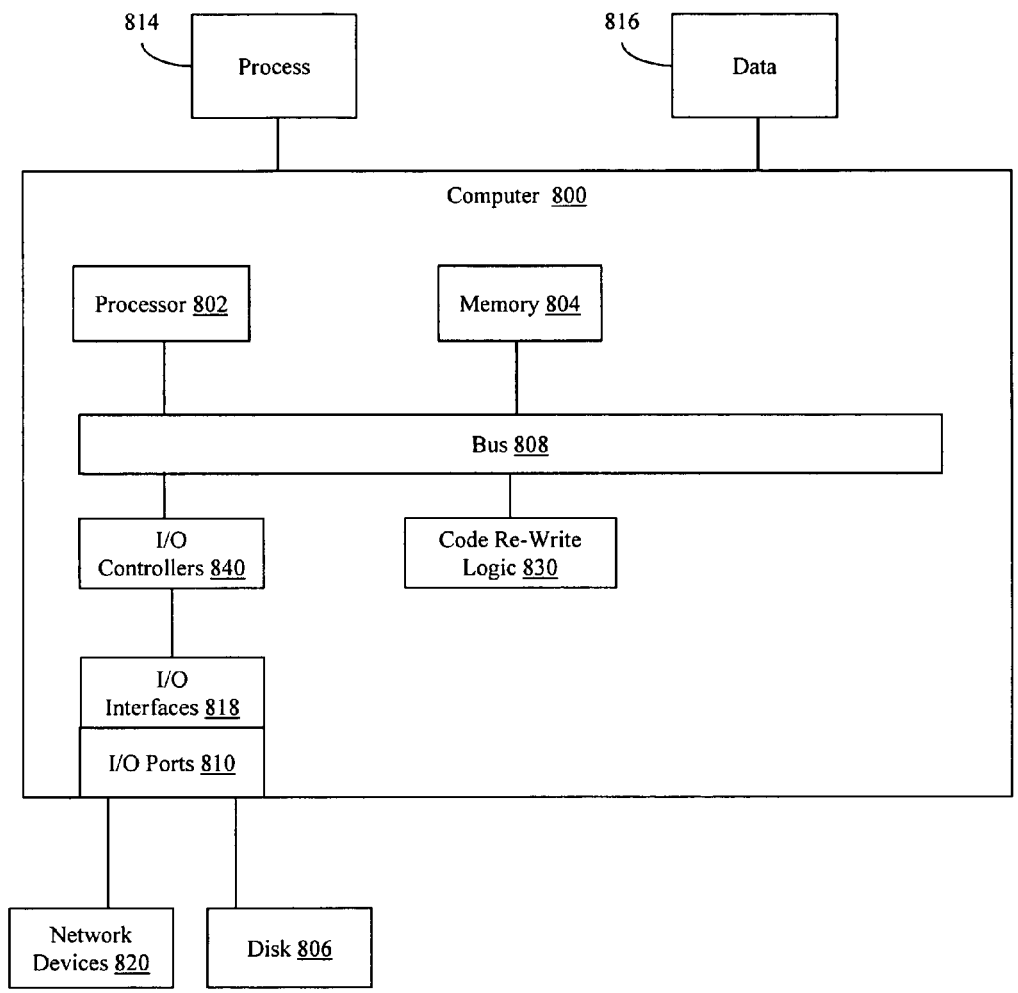
FIG. 8 illustrates an example computing environment in which example systems and methods illustrated herein can operate.

FIG. 8 illustrates an example computing device in which example systems and methods described herein, and equivalents, can operate. The example computing device may be a computer 800 that includes a processor 802, a memory 804, and input/output ports 810 operably connected by a bus 808. In one example, the computer 800 may include a code re-write logic 830 configured to facilitate re-ordering of instructions based on latency times. The code re-write logic 830 can be implemented similar to the code re-write logic 100, 305 described in FIG. 1 or 3, 4, or 5 respectively, and/or the other systems and methods described herein and their equivalents.

Generally describing an example configuration of the computer 800, the processor 802 can be a variety of various processors including dual microprocessor and other multiprocessor architectures. The memory 804 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 806 may be operably connected to the computer 800 via, for example, an input/output interface (e.g., card, device) 818 and an input/output port 810. The disk 806 can include, but is not limited to, devices like a magnetic disk drive, a solid state disk drive, a floppy disk drive, a tape drive, a Zip drive, a flash memory card, and/or a memory stick. Furthermore, the disk 806 can include optical drives like a CD-ROM, a CD recordable drive (CD-R drive), a CD rewriteable drive (CD-RW drive), and/or a digital video ROM drive (DVD ROM). The memory 804 can store processes 814 and/or data 816, for example. The disk 806 and/or memory 804 can store an operating system that controls and allocates resources of the computer 800.

The bus 808 can be a single internal bus interconnect architecture and/or other bus or mesh architectures. While a single bus is illustrated, it is to be appreciated that computer 800 may communicate with various devices, logics, and peripherals using other busses that are not illustrated (e.g., PCIE, SATA, Infiniband, 1394, USB, Ethernet). The bus 808 can be of a variety of types including, but not limited to, a memory bus or memory controller, a peripheral bus or external bus, a crossbar switch, and/or a local bus. The local bus can be of varieties including, but not limited to, an industry standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 800 may interact with input/output devices via i/o interfaces 818 and input/output ports 810. Input/output devices can include, but are not limited to, a keyboard, a microphone, a pointing and selection device, cameras, video cards, displays, disk 806, network devices 820, and the like. The input/output ports 810 can include but are not limited to, serial ports, parallel ports, and USB ports.

The computer 800 can operate in a network environment and thus may be connected to network devices 820 via the i/o devices 818, and/or the i/o ports 810. Through the network devices 820, the computer 800 may interact with a network. Through the network, the computer 800 may be logically connected to remote computers. The networks with which the computer 800 may interact include, but are not limited to, a local area network (LAN), a wide area network (WAN), and other networks. The network devices 820 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 820 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system, comprising:
an analysis logic configured to analyze executable instructions from an executable program and to identify load instructions within a clock cycle, where each load instruction has an associated latency time observed during execution of the program; and
a re-write logic configured to re-order selected load instructions within the executable program based on latency times for the selected load instructions.

2. The system of claim 1 where the re-write logic is configured to create a modified executable program from the executable program by re-ordering the selected load instructions without recompiling.

3. The system of claim 1 where the re-write logic includes a binary code re-writing tool.

4. The system of claim 1 where the analysis logic is configured to read the latency times from performance data that is collected at a run-time of the executable program on a user system to provide a customized optimization of the selected load instructions for the user system.

5. The system of claim 1 where the load instruction includes a memory read instruction.

6. The system of claim 1 where:
the analysis logic his configured to identify the selected load instructions that are within a bundle to be processed in the same clock cycle; and
the re-write logic is configured to re-order the selected load instructions within the bundle to cause a first load instruction having a greater latency time to occur before a second load instruction having a lesser latency time.

7. The system of claim 1 where the re-write logic is configured to re-order the selected load instructions in an order decreasing latency times where the selected load instructions occur consecutively in the executable program.

8. The system of claim 1 where the re-write logic is configured to re-order the selected load instructions dynamically within the executable program during a run-time of the executable program.

9. The system of claim 1 where the re-write logic is configured to re-order the selected load instructions by providing feedback to a compiler where the feedback indicates that the selected load instructions should be ordered in a selected sequence and causes the compiler to order the selected load instructions in the selected sequence.

10. . The system of claim 1 where the system is embodied as computer executable instructions.

11. A computing system, comprising:
a compiler configured to compile a source program into an executable program;
a processor configured to execute the executable program;
a performance monitoring logic configured to monitor performance data from the executing program where the performance data includes at least a latency time for load instructions within the executable program;
an analysis logic configured to identify the load instructions within a clock cycle, where each load instruction has an associated latency time that was observed during execution; and
a re-write logic configured to re-order the load instructions within the clock cycle in accordance with a decreasing order of their associated latency times.

12. The computing system of claim 11 where the load instructions include memory access instructions and where the associated latency time represents a length of time for completing each memory access instruction during run-time of the executable program.

13. The computing system of claim 11 where the re-write logic is configured to re-order the load instructions by providing feedback information to the compiler to cause the compiler to re-order the load instructions during compiling of the source code.

14. The computing system of claim 11 where the re-write logic is configured re-order the load instructions dynamically within the executing program.

15. The system of claim 1, where the load instructions include at least a first load instruction that occurs before a second load instruction in the executable program.

16. The system of claim 15, where the executable program is changed where the second load instruction occurs before the first load instruction.

\* \* \* \* \*

UNITED STATES PATENT AND TRADEMARK OFFICE
CERTIFICATE OF CORRECTION

| | | |
|---|---|---|
| PATENT NO. | : 8,990,547 B2 | Page 1 of 1 |
| APPLICATION NO. | : 11/209555 | |
| DATED | : March 24, 2015 | |
| INVENTOR(S) | : James R. Callister et al. | |

It is certified that error appears in the above-identified patent and that said Letters Patent is hereby corrected as shown below:

In the Claims

In column 10, line 63, in Claim 6, delete "his" and insert -- is --, therefor.

In column 11, line 4, in Claim 7, delete "order" and insert -- order of --, therefor.

In column 11, line 18, in Claim 10, delete "10.." and insert -- 10. --, therefor.

Signed and Sealed this
Fourteenth Day of July, 2015

Michelle K. Lee
*Director of the United States Patent and Trademark Office*